No. 722,640. PATENTED MAR. 10, 1903.
W. C. STICKEL.
NUT LOCK.
APPLICATION FILED JAN. 2, 1902.
NO MODEL.
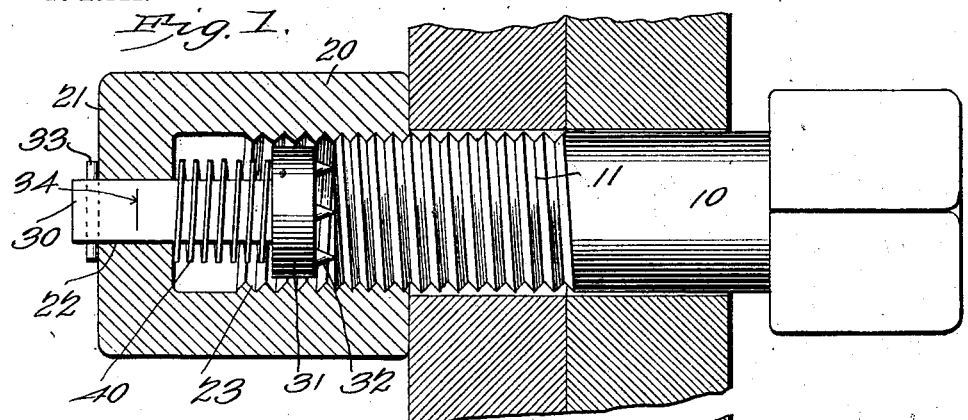
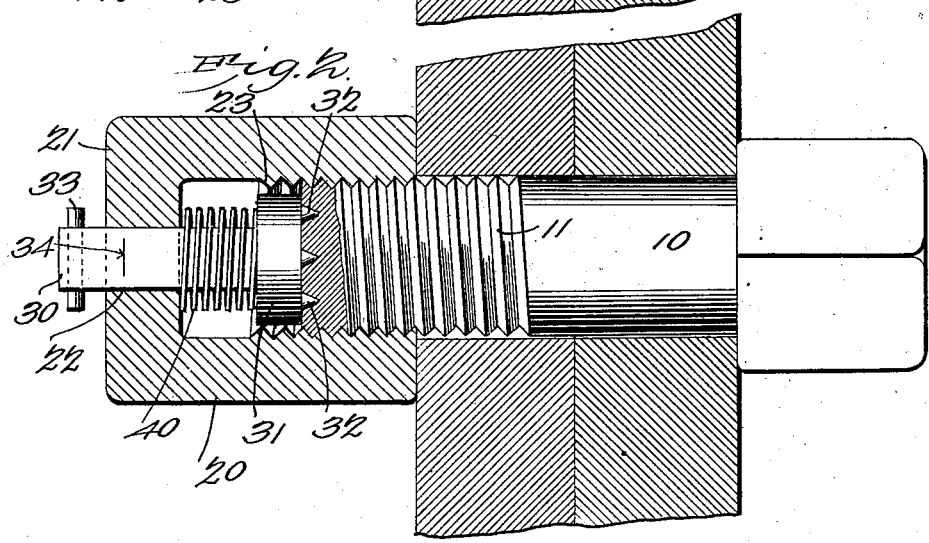
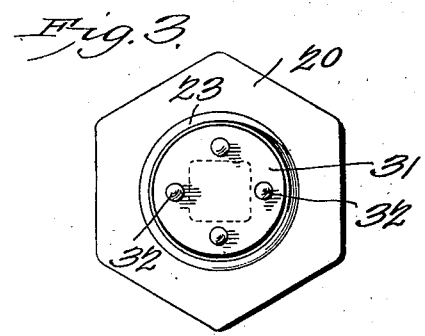
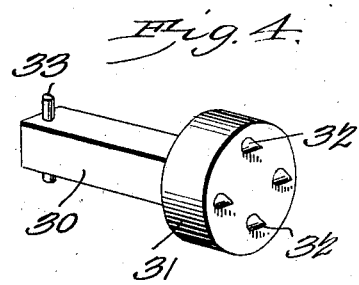
Witnesses
William C. Stickel, Inventor
by C. A. Snow & Co.
Attorneys.

UNITED STATES PATENT OFFICE.

WILLIAM C. STICKEL, OF HARMONY, PENNSYLVANIA.

NUT-LOCK.

SPECIFICATION forming part of Letters Patent No. 722,640, dated March 10, 1903.

Application filed January 2, 1902. Serial No. 88,213. (No model.)

*To all whom it may concern:*

Be it known that I, WILLIAM C. STICKEL, a citizen of the United States, residing at Harmony, in the county of Butler and State of Pennsylvania, have invented a new and useful Nut-Lock, of which the following is a specification.

The invention relates to nut-locks.

The object of the invention is to provide a simple and effective device for securely locking a nut upon a bolt against possibility of accidental separation therefrom, as from jars or vibrations incident to the passage of trains over a track or from other causes, and one which may readily be operated to permit removal of the nut when desired.

With these and other objects in view, as will appear as the nature of the invention is better understood, the same consists in the novel construction and combination of parts of a nut-lock, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof, and in these drawings—

Figure 1 is a view in sectional elevation, showing the position of the parts of the device before they are locked. Fig. 2 is a similar view showing the parts locked. Fig. 3 is a view in elevation looking from the inner face of the nut and exhibiting the locking device associated therewith. Fig. 4 is a perspective detail view of the locking device.

Referring to the drawings, 10 designates the bolt, provided with the usual screw-threads 11. Engaging the threads of the bolt is a cap-nut 21, provided with a central orifice 22 of some polygonal form, preferably square, the interior of the nut being furnished with screw-threads 23 for a portion of its length.

The locking device (shown in detail in Fig. 4) comprises a stem 30 of a shape in cross-section to fit the opening in the head of the cap-nut, one end of the stem being provided with a head 31, preferably integral therewith, and has on its outer face a plurality of spurs 32, by preference made integral with the head and tempered harder than the bolt in order that they may be driven into the end thereof, and thus form seats to hold both the bolt and nut from turning. By the provision of these hardened seat-forming spurs necessity of providing the bolt with orifices for their reception is obviated and the turning of the nut to a predetermined point to bring the spurs and seats into register is rendered unnecessary, as if the spurs are opposite a point on the bolt where there are no seats these may readily be formed in the manner described. The stem projects beyond the nut and carries at or near its outer end a transversely-disposed pin for limiting its longitudinal movement with relation to the nut and is also provided near the said end with an indicating-mark 34, constituting a visual means for determining the distance the bolt is to be screwed into the nut or the nut screwed onto the bolt.

In order to hold the spurs normally in engagement with the end of the bolt, a spring 40 is provided, which is coiled about the stem and bears one end against the head and at its opposite end against the crown of the nut.

The operation of the device will be readily understood. The nut is turned upon the bolt until the indicating-mark appears beyond the crown of the nut, and the stem is then struck with a hammer or other implement to drive the spurs into the end of the bolt, and thereby lock the two parts together, the spring operating positively to prevent accidental separation of the spurs from the bolt.

Having thus fully described my invention, what I claim as new, and desire to secure by Letters Patent, is—

1. The combination with a nut, of a locking device slidably associated therewith and provided on its inner end with means for forming the seats in the end of a bolt.

2. The combination with a nut, of a spring-pressed locking device having spurs on its inner end to be driven into the end of a bolt.

3. The combination with a nut, of a spring-pressed longitudinally-movable locking device having spurs on its inner end to be driven into the end of a bolt.

4. The combination with a nut, of a stem provided with a fixed head having seat-forming spurs on its inner face.

5. The combination with a nut, of a stem provided on its inner end with a head carrying seat-forming spurs, and a spring disposed between the said head and the crown of the nut.

6. The combination with a cap-nut having its crown provided with a polygonal opening, of a stem having a spur-carrying head disposed within the nut and its outer end projecting beyond the crown of the nut, means connecting with the latter end of the stem for limiting its movement with relation to the nut, and a spring disposed on the stem and bearing against the head and the inner wall of the crown.

In testimony that I claim the foregoing as my own I have hereto affixed my signature in the presence of two witnesses.

WILLIAM C. STICKEL.

Witnesses:
J. E. KOCHER,
IRA S. ZEIGLER.